Nov. 14, 1950　　　C. R. BARSBY　　　2,530,281
ROTARY INTERNAL-COMBUSTION ENGINE
Filed April 1, 1949　　　5 Sheets-Sheet 1
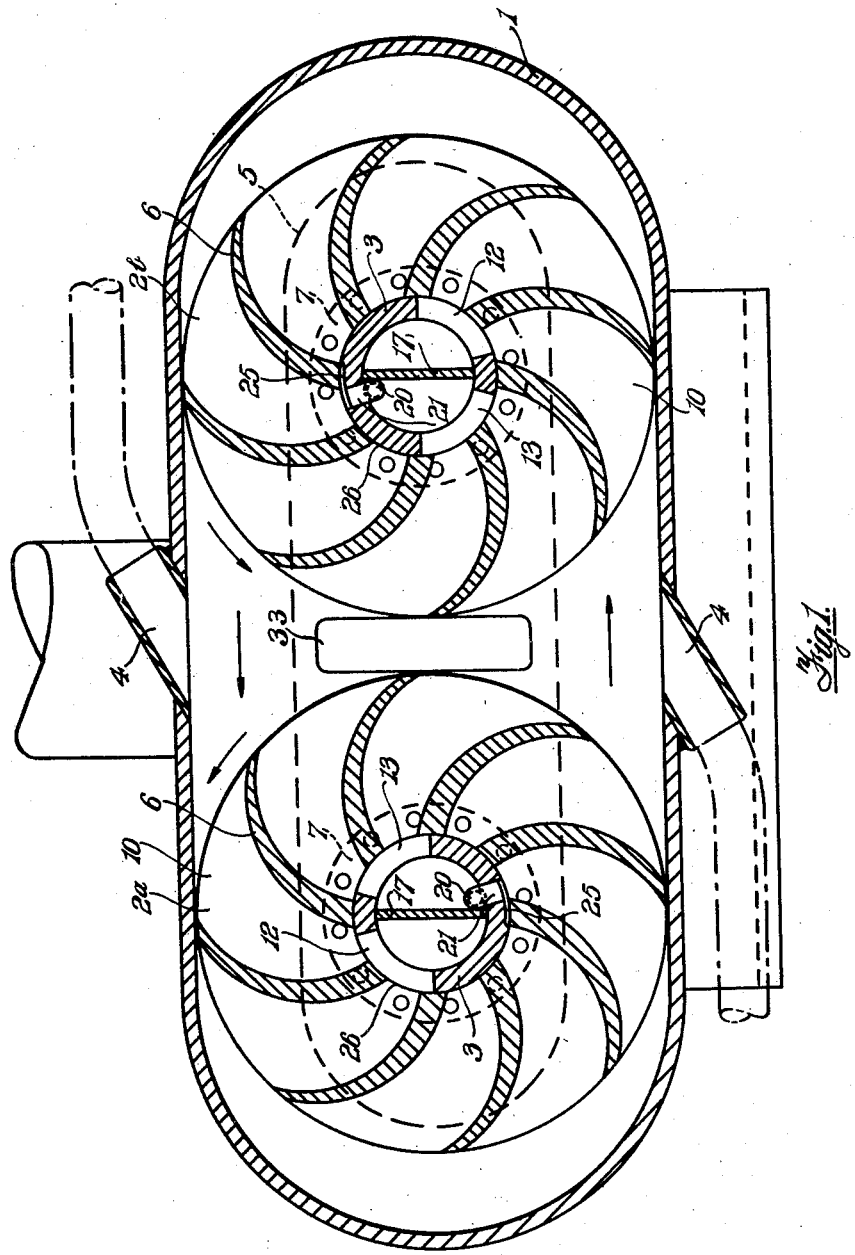
CHARLES RUTLAND BARSBY Inventor
By Beaumont Patch
　　　Attorneys.

Nov. 14, 1950     C. R. BARSBY     2,530,281
ROTARY INTERNAL-COMBUSTION ENGINE
Filed April 1, 1949     5 Sheets-Sheet 2
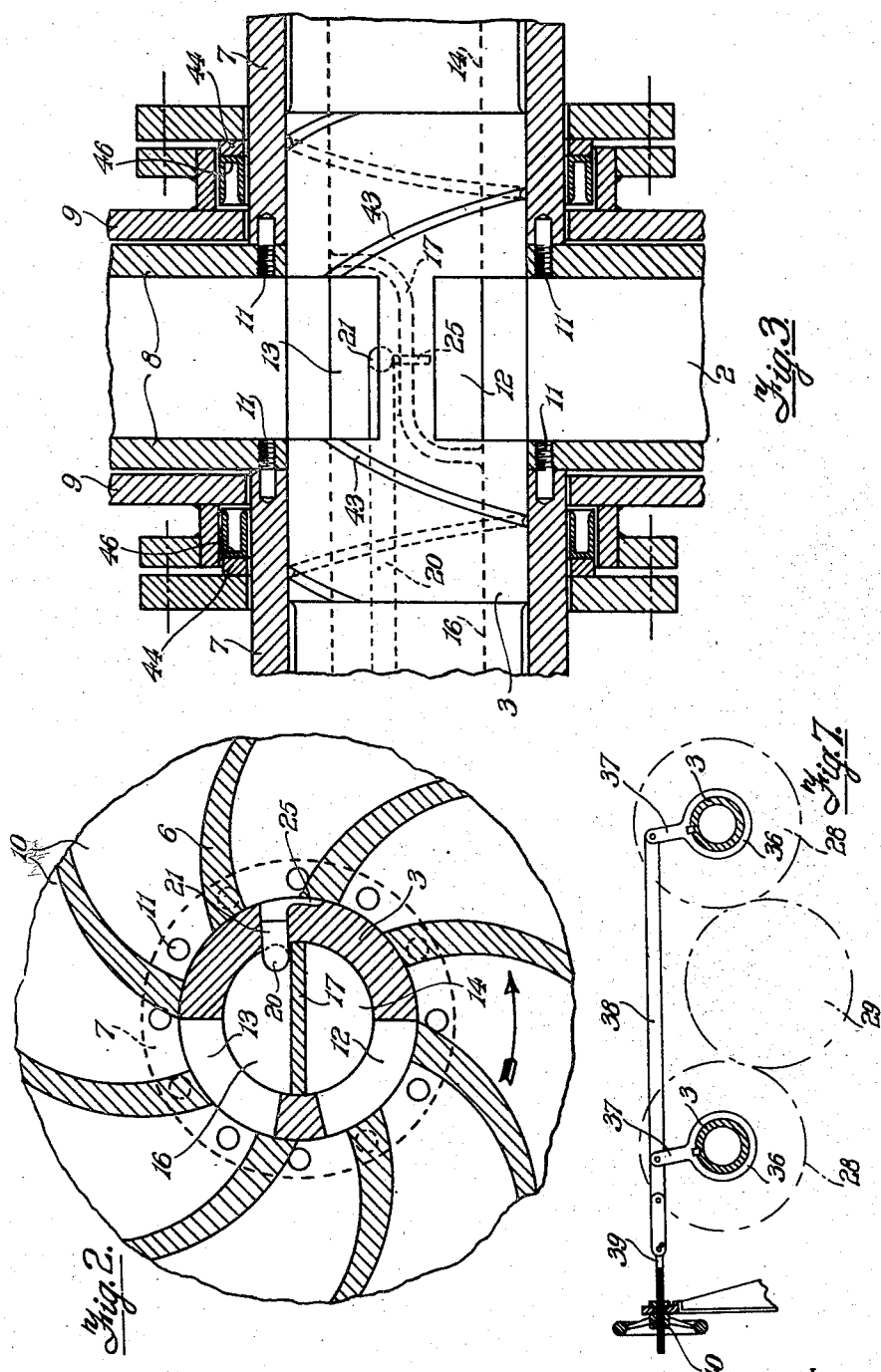
Inventor
CHARLES RUTLAND BARSBY
By
Attorneys

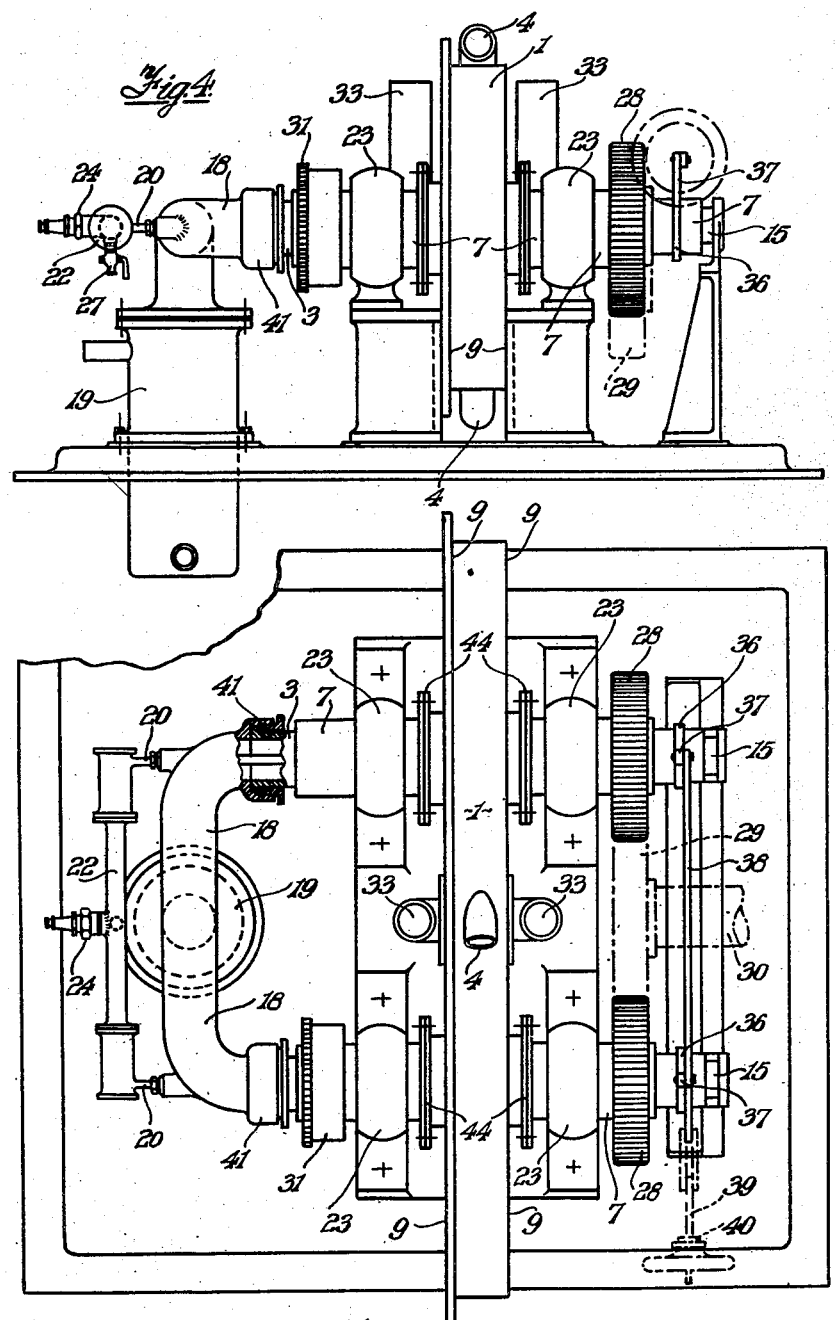

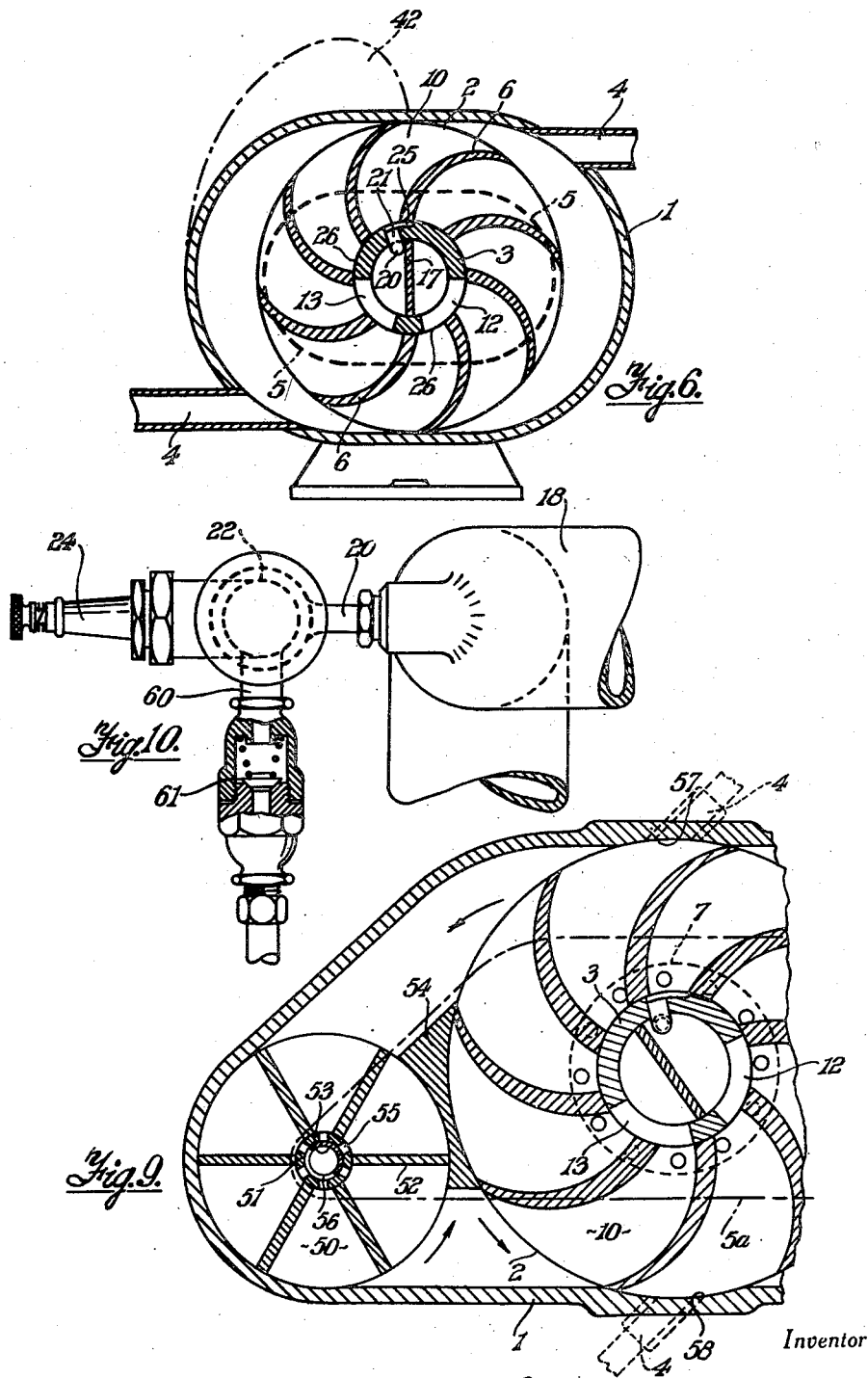

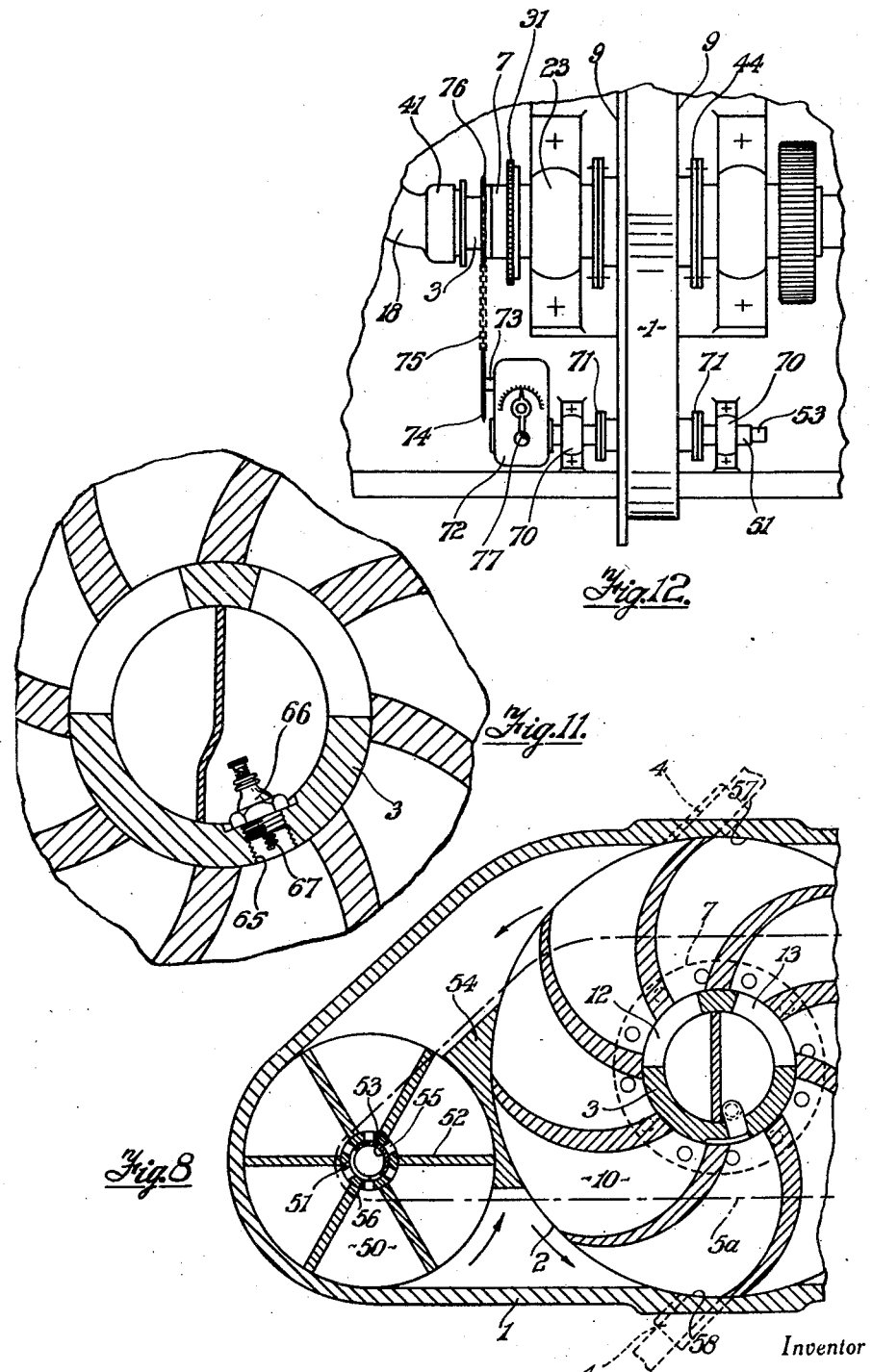

Patented Nov. 14, 1950

2,530,281

UNITED STATES PATENT OFFICE 2,530,281

ROTARY INTERNAL-COMBUSTION ENGINE

Charles Rutland Barsby, London, England

Application April 1, 1949, Serial No. 84,893
In Great Britain March 26, 1947

14 Claims. (Cl. 60—12)

This invention relates to improvements in rotary internal combustion engines and has for its object to provide a compact prime mover of simple construction having a higher power to weight ratio than existing internal combustion reciprocating engines.

According to the invention, the rotary internal combustion engine comprises at least one circular multi-bladed rotary impeller secured to or fast with a rotatable sleeve, said sleeve being mounted upon a static divided hollow shaft constituting a two compartment manifold, said rotor being mounted concentrically within a casing of substantially elliptical internal contour, so that upon entry of liquid into said casing the centrifugal force imparted to said liquid by rotation of said impeller causes said liquid to line said casing, and thereby form, between said blades, combustion chambers the volume of which will attain a maximum and a minimum value twice in succession during one revolution of said impeller, a combustible mixture introduced into each chamber as it is brought from a minimum to a maximum volume position during substantially one 90° phase of rotation of said impeller, said mixture being compressed during the succeeding 90° phase of rotation of said impeller in order, when said mixture is ignited, to provide a power stroke during a third phase of 90° rotation, and the products of combustion being exhausted during the final 90° phase of rotation.

In a preferred form of construction the engine according to the invention is provided with at least one booster pump adapted in operation to boost the flow of liquid along the peripheral and substantially elliptical wall of said casing, the said pump or pumps being preferably disposed within the engine casing. A shield plate may also be provided between the said pump or pumps and the circular rotary prime mover impeller or impellers, this shield being adapted to guide the said liquid toward the intake side of the pump.

According to a further embodiment, the rotary engine according to the invention comprises two multi-bladed rotary prime mover impellers mounted in tandem; the arrangement is preferably such as to provide for the projection of liquid by the escape gases from the emerging combustion chamber of one impeller during its power phase into an opposing combustion chamber of the other impeller during its exhaust phase so as to assist in the ejection of the products of combustion therefrom.

Further objects, advantages and characterizing features of the present invention will be apparent from the following description of preferred embodiments which, for illustrative purposes, are shown in the accompanying drawings wherein:

Fig. 1 is a sectional elevation of a preferred embodiment of the invention showing two impellers in end section, Fig. 2 is an end sectional elevation of the hub of an impeller, Fig. 3 is a longitudinal sectional elevation of the impeller shown in Figure 2, Fig. 4 is a side elevation of the general arrangement of the preferred embodiment, Fig. 5 is a plan view of the general arrangement as shown in Figure 4, Fig. 6 is a sectional elevation of another embodiment of the invention showing the impeller in end section, Fig. 7 is a detail view of an ignition timing adjustment means as shown in Figures 4 and 5, Fig. 8 is a sectional elevation of an alternative arrangement wherein a booster pump is disposed within the engine casing adjacent the compression quadrant of a rotary prime mover impeller, Fig. 9 is a sectional elevation of a further alternative arrangement wherein a booster pump is disposed adjacent the exhaust quadrant of a rotary impeller, Figure 10 is an enlarged fragmentary view partly in section of an alternative construction of ignition chamber to that shown in Figure 4, Figure 11 is a fragmentary sectional elevation of an impeller employing glow plug or a hotspot ignition means, Figure 12 is a fragmentary plan view of the arrangement shown in Fig. 8, illustrating the means for transmitting drive to the booster pump.

Referring first to Fig. 1 the embodiment illustrated comprises a casing 1 within which are housed two circular multi-bladed rotary prime mover impellers 2a, 2b, each mounted upon a static divided hollow shaft 3. Inlet ports 4 serve to admit a suitable liquid, such as water for instance, into the casing, the liquid being adapted, on rotation of the two impellers 2a and 2b in a like sense of rotation, to form a seal lining to the casing 1, the inner contour of which is indicated in broken line 5. This intake of liquid into the casing of the engine through the ports 4 may be supplemented or replaced by the intake of such liquid through that internal compartment which communicates with an induction port 12 in the static hollow divided shaft 3. The impellers 2a and 2b are formed with blades 6 curved radially outwards from a rotatable sleeve 7 and are preferably shrouded by disc members 8 (Fig. 3). Alternatively, inner walls 9 of the casing 1 may serve as side shrouds to combustion chambers 10 formed between the impeller blades 6. Threaded studs 11 or like securing means are employed to secure the shroud members 8 of the impeller to the rotatable sleeve 7 which latter is mounted in bearings 23 upon the static shaft 3.

The static divided hollow shaft 3 upon which the rotary impeller is mounted, is provided with two centrally disposed arcuate ports, the combustible mixture inlet port 12 and the exhaust port 13, the former communicating with a compartment 14 in the shaft 3 through which the combustible mixture is introduced from a known appropriate type of carburettor connected to a terminal flange 15. An exhaust compartment 16 into which the products of combustion are introduced through exhaust port 13 is isolated from the mixture intake compartment 14 by a partition wall 17. The products of combustion together with exhausted liquid are ejected from the compartment 16 into a conduit 18 feeding a separator 19 wherein the liquid is collected and returned to the liquid system for re-circulation. The liquid thus circulated, in addition to forming a liquid seal within the casing 1 also serves as a coolant to the engine, said liquid being cooled by passage through a radiator or like cooling device (not shown) interposed in the circuit between the separator 19 and inlet ports 4. Such cooling and separating means may, however, be dispensed with if the engine is employed on water craft or under conditions where the conservation of coolant supply is of no importance.

In order to maintain the desired volume of liquid within the casing 1 auxiliary exhaust ports 33 are preferably disposed in the side walls 9 of the casing so as to provide an overflow and maintain a mean depth of liquid seal whilst serving in addition to release excess products of combustion which may accumulate within said casing.

The liquid in the casing 1 may be employed as a lubricant to the bearing surface of the rotatable sleeve 7 and static shaft 3, the bearing surface of said shaft being formed with helical grooves 43 adapted to admit and distribute said lubricant.

A sealing gland 44 has two upwardly directed flanges adapted to be drawn together to compress a concealed annular cup-shaped washer 46 so as to prevent leakage of fluid between casing 1 and the outer surface of the rotatable sleeve 7.

In the embodiments illustrated in Figures 1 to 6 and 8 and 9 of the accompanying drawings a combustible mixture is initially ignited in an ignition chamber 22 by a spark plug or like ignitor means 24 disposed in the wall of said ignition chamber, a gas flame so produced being ejected into the combustion chamber 10 through a conduit 20 terminating in an ignition port 21 in the peripheral wall of the static shaft 3. The ignition port 21 is so positioned in the static shaft 3 as to communicate with a combustion chamber 10 of the rotating impellers 2a, 2b when the combustible mixture admitted to said combustion chamber through intake port 12 is under maximum compression, an open apex 26 of said chamber formed between impeller blades 6 being coincident with said ignition port. In order that chain-wise ignition in the succeeding combustion chambers should ensue after initial ignition from the ignition chamber 22 the ignition port 21 is formed co-extensive with a slot 25 on the outer periphery of the static shaft 3 so as to permit a portion of the ignited mixture from the ignited combustion chamber to be ejected into the succeeding chamber. A bleed cock 27 on the ignition chamber 22 is adapted to release air from the conduit 20 and so permit this chamber to be initially filled with combustible mixture from the casing 1 into which it has been introduced through inlet port 12.

In an alternative arrangement to that wherein the ignition chamber 22 is initially filled with combustible mixture from the casing 1, the bleed cock 27 is dispensed with and, as shown in Figure 10, a pipe 60 is provided for introducing for initial ignition purposes a supply of a combustible mixture directly to the chamber 22 through a non-return valve 61.

The ignition chamber 22 is adapted to provide simultaneous ignition for the impellers 2a, 2b on initially starting the engine and thereafter to provide continuity through conduits 20 between the ignition port 21 of the impeller 2a and that of the impeller 2b so that the ignition of one impeller can be re-started from the other in the event of a misfire.

The rotatable sleeve 7 of each impeller 2a and 2b, carries a pinion 28, each pinion 28 being geared with a third pinion 29 mounted upon a common power take-off shaft adapted, in operation, to drive a load through a normal clutch mechanism (not shown). A pinion 31 mounted upon one of the two rotatable sleeves 7 is adapted to engage with a starter motor (not illustrated), which motor enables the impellers 2a and 2b which are intergeared through pinion 29, to be run up to such a speed as to provide a motive liquid lining around the peripheral wall of the casing 1.

The static shafts 3 upon which the impellers 2a and 2b are mounted, are each provided with a locking ring 36 keyed thereto, each ring 36 having a radially extended arm 37 engaging with a common ignition timing adjustment rod 38. The rod 38 is provided with a threaded linkage member 39 engaging with an adjusting collar 40. By the restricted angular movement of the static shaft 3 the position of the ignition port 21 and associated co-extensive slot 25 is adjusted in relation to the aqueous lining contour 5 and consequently the ignition time is effectively varied within limits in relation to the state of compression existing within the combustion chamber to be ignited. A stuffing-box 41 is provided to seal the end of the shaft 3 with exhaust conduit 18 so as to permit an angular movement of the shaft for adjustment of the ignition timing.

The operation of the engine above described is as follows:

The condition for starting is first established by operating the starter means coupled to pinion 31 whereby the impellers 2a and 2b are driven in an anti-clockwise direction of rotation. The liquid admitted through ports 4 in the peripheral wall of the casing 1, is thus adapted to form a liquid lining by centrifugal force imparted by the impeller blades 6. As the impellers are rotated through one revolution, the gaseous volume of each combustion chamber 10 is varied as the liquid seal abutment maintains its inner contour level 5. Thus the uppermost combustion chamber 10 of impeller 2a (Fig. 1) is shown at the commencement of the induction phase. On further rotation and during a first 90° phase of rotation the inner wall of the aqueous lining moves outwards from the impeller axis inducing into the combustion chamber the combustible mixture through the intake port 12. In the succeeding 90° phase of rotation the liquid lining co-operates with the walls of the combustion chamber to subject the imprisoned combustible mixture to compression. Ignition of the compressed mixture takes place when the combustion chamber becomes coincident with the slot 25, the mixture being ignited initially by a gas flame ejected from the ignition port 21 and subsequently by chainwise ignition through slot 25 from the preceding combustion chamber. The degree of curvature of the impeller blades 6 is such as to cause the resultant explosive force to be directed against the forward blade of the combustion chamber during the third 90° phase of rotation to accomplish the power phase. During a final 90° phase of rotation the cycle is completed, the products of combustion being ejected through the exhaust port 13, which now communicates with the combustion chamber, being displaced by the inner wall of the liquid lining 5.

It will be understood from the above description that each combustion chamber of each impeller 2a and 2b may be arranged to fire consecutively, being analogous in this respect to a sixteen cylinder reciprocating engine. Alternatively, the impellers 2a and 2b may be in rotational alignment as shown in Fig. 1 so as to provide for the simultaneous firing of the combustion chambers of each impeller and thus be analogous to an eight cylinder reciprocating engine. Furthermore, the number of combustion chambers employed in the impellers is not limited to the eight shown on the accompanying drawings.

The alternative embodiment of the present invention as shown in Fig. 6 of the accompanying drawings provides for an engine having an analogous operation to that described above with reference to Fig. 1. This alternative embodiment, (for which like references have been used to denote the like parts in the drawings) employs a single impeller concentrically housed in a casing 1 of substantially elliptical shape. The broken line 42 denotes the shape of a modified form of casing 1 adapted to compensate for irregularities in contour 5 of the liquid lining which result from a backstream of liquid from the combustion chamber 10 on detonation of the combustible mixture contained therein, this liquid being deflected towards the normally curved portion of the casing in readiness for effecting the exhaust phase of the engine.

The impeller 2 of this single impeller embodiment is of like construction to impellers 2a and 2b employed in the embodiment shown in Fig. 1, the rotatable sleeve 7 being formed with a pinion 28 geared to a power take off shaft and having a pinion 31 adapted to engage with a starter motor.

In the form of construction shown in Fig. 8 of the accompanying drawings a rotary pump 50 is provided within the engine casing adjacent the compression stroke quadrant of an adjacent rotary prime mover impeller 2. The rotary part of the pump 50 preferably consists in a sleeve member 51 having blades 52 extending radially therefrom, the said sleeve member 51 being rotatably mounted upon a hollow shaft 53 disposed in an axis parallel to that or those about which the rotary impeller or impellers 2 rotate. A transverse shield plate 54 is located between the pump rotor 50 and its adjacent impeller 2, this plate being of such shape as to direct the flow of the liquid seal, the inner contour of which is shown by broken line 5a, toward the intake side of the pump 50.

As shown in Figure 12, the pump rotor sleeve 51 is extended through both side walls 9 of the casing 1 and constitutes the driven shaft of the pump. This driven shaft is mounted in bearings 70 and is provided with sealing glands 71 of the type shown at 44 in Fig. 3. As shown, the shaft 51 is driven through a gear box 72 from a shaft 73 upon which is keyed a pinion 74, this pinion 74 being driven through a chain or the like 75 from a pinion 76 which is keyed to the rotatable sleeve shaft 7 of the impeller 2 adjacent to the pump. The gear box 72 is of known type and is preferably of the kind providing variable ratio drive so that by adjustment of the lever 77 the drive ratio between the input shaft 73 and the output shaft 51 thereof can be varied. The purpose for such variation will be described hereinafter.

For the purpose of starting or assisting in the starting of the engine, a driving means independent of the rotary impellers 2 may be provided; the function of such an independent means will be described hereinafter. In either case the pump is adapted to rotate under normal conditions at a speed such as to preserve and maintain an aqueous lining to the casing wall.

The sleeve member 51 upon which the radial blades 52 are mounted, is preferably provided with ports 55 disposed between adjacent blades. The static hollow shaft 53 upon which said pump rotor 50 rotates is provided with a port 56 extending over an arc of approximately 180°. Thus the seal liquid or a part thereof may be introduced into or withdrawn from the engine casing, during circulation of said liquid for cooling, through the hollow shaft 53, port 56 and ports 55.

In Fig. 8 of the accompanying drawings the rotary pump 50 is disposed adjacent the compression phase quadrant of the impeller 2. As will be readily appreciated, with a rotary internal combustion engine having two rotary impellers as that shown in Fig. 1 a booster pump will be provided adjacent the compression phase quadrant of each impeller. Should two such booster pumps be employed these will preferably be driven in a synchronous manner through variable ratio gearing such as is shown at 72 in Figure 12.

By varying the ratio of the gearing 72 through which the drive to the booster pump or pumps is applied by adjustment of a lever 77 the speed of the pump or pumps may be varied relative to that of the impeller or impellers. Thus should the speed of the pump be increased to a value above that at which the impeller is rotating, this will result in an increased compression in the impeller combustion chambers operating in their compression phase as the pump 50 will tend to boost the flow of liquid forming the sealing medium towards the combustion chambers 10 of the impeller 2 so as to reduce their gaseous volume by causing the inner contour 5a of the liquid seal to approach nearer to the axis of the impeller 2. Should this result in a deficiency of liquid on the intake side of the pump this liquid may be supplemented through the hollow shaft 53, port 56 and ports 55. Thus the variable ratio gearing referred to above provides a means whereby the compression in the combustion chambers 10 of the rotary impellers can be readily controlled.

Where an independent driving means is employed to operate the booster pump adjacent to the compression phase quadrant of the rotary impellers, for starting the engine, the liquid for forming the seal is preferably introduced into the casing 1 through the hollow shaft 53, this liquid being projected into the combustion chambers 10 of the impellers by the rotary blades of the pump so as to impart to the impellers a rotary movement. The combustible mixture may then be admitted to the combustion chambers 10 of the impellers after the latter have reached a sufficient speed of rotation.

The shield plate 54, in addition to deflecting the flow of the seal liquid through the booster pump 50, serves to isolate the chambers 10 as they embark upon their compression phase from those approaching the final stage of their induction phase, thus ensuring that a variable compression of the gaseous volume within the combustion chambers can be effectively obtained by variation of the speed of the pump.

In order to isolate more efficiently the combustion chambers 10 undergoing their compression phase from those undergoing their power phase, and the combustion chambers in their exhaust phase from those into which the combustible mixture is being induced through the port 12, the casing 1 is recessed as at 57 and 58. In addition to isolating the combustion chambers 10 undergoing their compression phase from those undergoing their power phase the closure of the combustion chambers by the inner surface of the recess 58 at the instant the combustible mixture therein is ignited, ensures that the initial force due to the expansion of the combustible mixture after ignition is directed against the impeller blades.

As shown in broken line, the liquid inlet ports 4 of the casing 1 may be disposed within one or both of the recesses 57 and 58 as an alternative position to those shown, by way of example, on Figures 1 and 6.

In the arrangement shown in Fig. 9 a rotary booster pump 50 identical in construction with that shown in Fig. 8 is disposed adjacent the exhaust port quadrant of a rotary prime mover impeller 2. As illustrated the booster pump is also disposed adjacent a curved portion of the substantially elliptical peripheral wall of the engine casing 1. The transverse shield plate 54 is again employed to direct the flow of the liquid seal toward the intake side of the pump 50. In addition to deflecting the flow of the liquid seal, the shield plate 54 serves to isolate the combustion chambers 10 as they embark upon their exhaust phase from those approaching the final stage of their work phase.

The arrangement shown in Fig. 9 is particularly applicable for use with the single prime mover impeller type engine as shown in Fig. 6 or with a dual impeller type engine wherein the exhaust port quadrants of the impellers are arranged adjacent curved portions or the peripheral wall of the casing 1. Whilst the embodiment of the engine shown in Fig. 1 is so arranged that the induction and compression phase quadrants of each impeller are adjacent the curved portions of the peripheral wall of the casing 1, it will be readily appreciated that the hollow divided static shafts 3 may be rotated through 180° so that the work and exhaust phase quadrants occupy this position.

In operation, the booster pump disposed adjacent an exhaust phase quadrant of a rotary prime mover impeller by reason of its boosting of the flow of the liquid seal, assists in the scavenging of each combustion chamber as it passes through the latter part of its exhaust phase. In other respects a booster pump so disposed is preferably constructed in the manner shown and described with reference to Fig. 8 of the drawings. As with the embodiment shown in Fig. 8 the casing 1 is recessed as at 57 and 58, one or both of these recesses having disposed therewithin liquid inlet ports 4 through which the whole or part of the liquid for forming the peripheral seal to the casing may be introduced.

It will be readily appreciated that where it is desired to position such a booster pump between the impellers and adjacent a straight portion of the peripheral wall of a dual impeller engine, the shield plate would be suitably shaped to prevent undesirable interaction in the operation of oppositely positioned quadrants of the adjacent prime mover impellers.

It is to be understood that the scope of the invention is not restricted to a rotary combustion engine employing an ignition system of the kind illustrated in Figs. 1 to 6 and Figs. 8 and 9 of the accompanying drawings. Thus, according to an alternative arrangement, the ignition chamber 22, conduit 20 and ignition port 21 are dispensed with and, as illustrated in Fig. 11, a bore 62 is provided in the peripheral wall of the static shaft 3 at the position formerly occupied by the ignition port 21, this bore 65 being adapted to receive an electrically operated glow plug or combined glow plug and hot-spot igniter 66. Electric conductors for feeding electric ignited means of this kind are passed from a suitable electric source through a compartment of said static shaft 3 and are enclosed in a sheathing of asbestos or like insulating and fire-proof material; where the igniter means 66 is of the combined glow plug and hot-spot igniter type the heater coils 67, which are heated electrically for an initial period only, and thereafter derive their heat from the combustion of the combustible mixture, are made from material having a sufficient heat retaining property to ensure that the mixture in the combustion chamber 10 is ignited as soon as it becomes exposed to the heater coils. As will be readily appreciated where it is not desired to employ a glow plug having hot-spot qualities it is necessary to feed the heater coils thereof with electric current continuously.

I claim:

1. A four-cycle rotary combustion engine comprising in combination: a closed casing of substantially elliptical internal contour; at least one hollow divided shaft mounted transversely within said casing; sleeves rotatably mounted on said shaft at either end thereof; a plurality of curved equispaced and substantially radially disposed blades secured to said sleeves and defining combustion chambers; shroud plates secured with said sleeves and said blades, said shroud plates and said blades constituting a multi-bladed rotary prime mover impeller; a liquid inlet in said casing; a liquid outlet in said casing; means connected with said shaft for introducing a combustible mixture through one ported division of said shaft to said combustion chambers, the other division of said shaft constituting an exhaust fluid outlet from said casing and being peripherally ported at the curved surface of said shaft; means disposed in said shaft for igniting said combustible mixture in said impeller; and a power take-off means coupled to at least one of said sleeves.

2. A four-cycle rotary combustion engine comprising in combintion: a closed casing of substantially elliptical internal contour; at least one hollow divided shaft mounted transversely within said casing; sleeves rotatably mounted on said shaft at either end thereof; a plurality of curved equispaced and substantially radially disposed blades secured to said sleeves and defining combustion chambers; said sleeves and said blades constituting a multi-bladed rotary prime mover impeller; a liquid inlet in said casing; a liquid outlet in said casing; means connected with said shaft for introducing a combustible mixture through one ported division of said shaft to said combustion chambers, the other division of said shaft constituting an exhaust fluid outlet from said casing and being peripherally ported at the curved surface of said shaft; means disposed in said shaft for igniting said combustible mixture in said impeller; and a power take-off means coupled to at least one of said sleeves.

3. A four-cycle rotary combustion engine comprising in combination: a closed casing of substantially elliptical internal contour; at least one hollow divided shaft mounted transversely within said casing; sleeves rotatably mounted on said shaft at either end thereof; a plurality of curved equispaced and substantially radially disposed blades secured to said sleeves; shroud plates secured with said sleeves and said blades, said shroud plates and said blades constituting a multi-bladed rotary prime mover impeller; a liquid inlet in said casing; a liquid outlet in said casing; means connected with said shaft for introducing a combustible mixture through one ported division of said shaft constituting an exhaust fluid outlet from said casing and being peripherally ported at the curved surface of said shaft; means disposed in said shaft for igniting said combustible mixture in said impeller; a power take-off means coupled to said sleeves; and at least one rotary pump disposed within said casing adjacent the peripheral wall thereof for impelling said liquid therearound.

4. A four-cycle rotary combustion engine comprising in combination: a closed casing of substantially elliptical internal contour; at least one hollow divided shaft mounted transversely within said casing; sleeves rotatably mounted on said shaft at either end thereof; a plurality of curved equispaced and substantially radially disposed blades secured to said sleeves and defining combustion chambers; shroud plates secured with said sleeves and said blades, said shroud plates and said blades constituting a multi-bladed rotary prime mover impeller; a liquid inlet in said casing; a liquid outlet in said casing; means connected with said shaft for introducing a combustible mixture through one ported division of said shaft to said combustion chambers, the other division of said shaft constituting an exhaust fluid outlet from said casing and being peripherally ported at the curved surface of said shaft; means disposed in said shaft for igniting said combustible mixture in said impeller; a power take-off means coupled to said sleeves; at least one liquid-impelling rotary pump disposed within said casing adjacent the peripheral wall thereof; and a liquid-guiding shield plate disposed between a portion of the peripheral edge of said rotary pump and a portion of the peripheral edge of said rotary prime mover impeller.

5. A four-cycle rotary combustion engine according to claim 1, wherein the said combustible mixture is initially ignited after compression by a gas flame, said gas flame being admitted to said combustion chamber through a slot formed in the outer periphery of said shaft co-extensive with an ignition port disposed in the peripheral wall of said hollow divided static shaft, said port communicating by way of a conduit passing through said hollow divided static shaft, with a remotely situated ignition chamber wherein said gas flame is produced.

6. A four-cycle rotary combustion engine according to claim 5, said ignition port being angularly adjustable, the advancement or retardation of said ignition being effected by adjustment of the angular position of said ignition port in the peripheral wall of said hollow divided static shaft in relation to the impeller rotatable sleeve.

7. A four-cycle rotary combustion engine according to claim 1, wherein said combustible mixture is ignited after compression by an electric igniter disposed within a bore in the peripheral wall of said hollow divided static shaft.

8. A four-cycle rotary combustion engine according to claim 1, wherein said combustible mixture is ignited after compression by a hot-spot igniter disposed within a bore in the peripheral wall of said hollow divided static shaft.

9. A four-cycle rotary combustion engine according to claim 1, wherein the inner peripheral surface of said closed casing is arcuately recessed to conform to a portion of the circular path defined by the peripheral edge of the circular rotary prime mover impeller.

10. A four-cycle rotary combustion engine according to claim 3 wherein the liquid or a part thereof lining the peripheral wall of said casing is introduced into said casing through a hollow shaft having a port formed therein, said shaft having mounted thereon a rotatable sleeve in which are formed a series of equispaced ports extending therethrough and having mounted thereon a series of radially disposed blades secured to said sleeve at points thereon intermediate adjacent ports therein.

11. A four-cycle rotary combustion engine according to claim 1, wherein the liquid or a part thereof for lining the peripheral wall of said casing is introduced into said casing through the first said division in said hollow divided shaft of said rotary prime mover impeller.

12. A four-cycle rotary combustion engine according to claim 3 wherein the liquid or a part thereof lining the peripheral wall of said casing is withdrawn from said casing through a hollow shaft having a port formed therein, said shaft having mounted thereon a rotatable sleeve in which are formed a series of equispaced ports extending therethrough and having mounted thereon a series of radially disposed blades secured to said sleeve at points thereon intermediate adjacent ports therein.

13. A four-cycle rotary combustion engine according to claim 3 wherein said pump is driven through gearing from the rotary prime mover impellers.

14. A four-cycle rotary combustion engine according to claim 3 wherein said pump is driven through a variable ratio gearing, to enable the speed of the pump to be varied relative to the speed of the rotary impeller.

CHARLES RUTLAND BARSBY.

REFERENCES CITED

The following references are of record in the file of this patent:

UNITED STATES PATENTS

| Number | Name | Date |
|---|---|---|
| 1,045,732 | Nash | Nov. 26, 1912 |